US010451210B2

(12) United States Patent
Wu et al.

(10) Patent No.: US 10,451,210 B2
(45) Date of Patent: Oct. 22, 2019

(54) SOFT BODY ROBOT FOR IN-PIPE MISSIONS

(71) Applicant: Massachusetts Institute of Technology, Cambridge, MA (US)

(72) Inventors: You Wu, Cambridge, MA (US); Kamal Youcef-Toumi, Cambridge, MA (US); Solène Marie Amélie Demay, Jouy-en-Josas (FR)

(73) Assignee: Massachusetts Institute of Technology, Cambridge, MA (US)

( * ) Notice: Subject to any disclaimer, the term of this patent is extended or adjusted under 35 U.S.C. 154(b) by 183 days.

(21) Appl. No.: 15/597,345

(22) Filed: May 17, 2017

(65) Prior Publication Data

US 2018/0335176 A1    Nov. 22, 2018

(51) Int. Cl.
| | |
|---|---|
| F16L 55/40 | (2006.01) |
| F16L 55/38 | (2006.01) |
| G01M 3/00 | (2006.01) |
| B25J 18/00 | (2006.01) |
| F16L 101/30 | (2006.01) |

(52) U.S. Cl.
CPC .............. *F16L 55/40* (2013.01); *B25J 18/00* (2013.01); *F16L 55/38* (2013.01); *G01M 3/00* (2013.01); *F16L 2101/30* (2013.01)

(58) Field of Classification Search
CPC ......... G01M 3/00; G01M 3/005; F16L 55/28; F16L 55/40; F16L 2101/30
USPC .......................................... 73/40, 49.1, 49.5
See application file for complete search history.

(56) References Cited

U.S. PATENT DOCUMENTS

| | | | |
|---|---|---|---|
| 3,508,433 A | 4/1970 | Bustin | |
| 4,646,787 A | 3/1987 | Rush et al. | |
| 5,398,560 A * | 3/1995 | Zollingger | G01N 27/902 324/220 |
| 6,162,171 A * | 12/2000 | Ng | A61B 1/00156 600/101 |
| 6,404,189 B2 * | 6/2002 | Kwun | G01N 22/00 324/220 |
| 7,182,025 B2 | 2/2007 | Ghorbel et al. | |
| 9,464,642 B2 | 10/2016 | Ilievski et al. | |

(Continued)

FOREIGN PATENT DOCUMENTS

EP          2865457 A1    4/2015

OTHER PUBLICATIONS

Vickers, A.L., "The future of water conservation: Challenges ahead," Water Resources Update, Universities Council of Water Resources, Tech Rep 1999.

(Continued)

*Primary Examiner* — Benjamin R Schmitt
(74) *Attorney, Agent, or Firm* — Nutter McClennen & Fish LLP (57) ABSTRACT

Passive robot for transporting sensors and instruments such as leak sensors into water pipes. The robot includes a leak sensor having a diameter to fit closely within a water pipe. A leak sensor is flanked by, and bonded to, substantially symmetrical first and second soft bodies. End caps are provided on each of the first and second soft bodies. Each of the soft bodies has a tapering configuration with a neck portion wherein a soft body length to neck width ratio is selected to allow the soft bodies to bend permitting the passive robot to pass through sharp bends and T junctions.

20 Claims, 4 Drawing Sheets

(56) References Cited

U.S. PATENT DOCUMENTS

| | | | |
|---|---|---|---|
| 2010/0258362 A1 | 10/2010 | Trimmer | |
| 2015/0330551 A1* | 11/2015 | Van Nie | G01N 29/225 138/98 |
| 2016/0252110 A1 | 9/2016 | Galloway et al. | |

OTHER PUBLICATIONS

Chatzigeorgiou, D., et al. "Reliable sensing of leaks in pipelines," ASME Dynamic Systems and Control Conference, 2013.

Chatzigeorgiou, D., et al. "Design of a novel in-pipe reliable leak detector," IEEE ASME Transactions on Mechatronics, 2014.

Fletcher, R. et al. "Smartball: A new approach in pipeline leak detection." American Society of Mechanical Engineers, 2008, 7th International Pipeline Conference, p. 117-133.

Wu, You, et al. "Design of a maneuverable swimming robot for in-pipe misions," IEEE RSJ International Conference on Intelligent Robots and Systems, 2015, p. 4864-4871.

Quarini, J. et al. "A review of fluid-driven pipeline pigs and their applications." Proceedings of the Institution of Mechanical Engineers, Part E: Journal of Process Mechanical Engineering, 2007, vol. 221, issue 1, p. 1-10.

Schempf, Hagen et al. "Explorer: untethered real-time gas main assessment robot system." Process of Int. Workshop on Advances in Service Robotics, ASER, 2003, vol. 3.

Shepherd, R.F. et al. "Multigait soft robot." Proceedings of the National Academy of Sciences, 2011, vol. 8, No. 51, p. 20 400-20 403.

Tolley, M.T. et al. "A resilient, untethered soft robot." Soft Robotics, 2014, vol. 1 No. 3, p. 213-223.

Frutiger, A. et al. "Capacitative soft strain sensors vis multicore-shell fiber printing." Advanced Materials, 2015, vol. 27 No. 15, p. 2440-2446.

Muth, J.T. et al. "Embedded 3d printing of strain sensors within highly stretchable elastomers." Advanced Materials, 2014, vol. 26 No. 36, p. 6307-6312.

Cloitre, A. et al. "Design and control of a field deployable batoid robot." 2012 4th IEEE RAS & EMBS International Conference on Biomedical Robotics and Biomechatronics (BioRob), 2012, p. 707-712.

Alvarado, P.V. y, et al. "Design of machines with compliant bodies for biomemetic locomotion in liquid environments." Journal of Dynamic Systems, Measurement, and control, 2006, vol. 128 No. 1, p. 3-13.

Chatzigeorgiou, D. et al. "Design and evaluation of an in-pipe leak detection sensing technique based on force transduction." ASME International Mechanical Engineering Congress and Exposition, 2012.

[NoAuthorListed] National Water Research Institute—Meteorological Service of Canada, "Threats to water availability in Canada," Environment Canada. 2004.

Wu, Y., et al, "Design of a leak sensor for operating water pipe systems," The 2017 IEEE/RSJ Int'l Conf. on Intelligent Robots and Systems (IROS), Sep. 24-28, 2017, Vancouver, BC, Canada, IEEE.

International Search Report and Written Opinion for Application No. PCT/US18/31317, dated Jul. 26, 2018 (8 pages).

* cited by examiner

SOFT BODY ROBOT FOR IN-PIPE MISSIONS

BACKGROUND OF THE INVENTION

This invention relates to transportation of sensors and instruments inside water pipes, and more particularly to a passive robot with a soft, squeezable body that can maneuver through sharp 90 degree bends and T-junctions in pipes while carrying a leak detection sensor.

Underneath the streets in every city around the world, water pipe systems distribute this precious resource quietly and their important problems are usually unnoticed. One such problem is pipe leakage. It has been reported that around 20% of the clean water supply in almost all countries around the globe is lost due to leaks [1], [2]. In regions of water scarcity such as Saudi Arabia, the leak rate is even higher, at more than 30% [3]. By reducing leaks, a society can meet more water demand with the current production capacity. Leak reduction can directly alleviate the global clean water shortage which is going to be more severe as population grows.

Water leaks are difficult to find. While water pipe bursts happen occasionally, small leaks exist all the lime in every mile of underground water pipes. Those small leaks account for most of the water losses, and they can develop into big leaks and eventually pipe bursts. The typical above-ground manual detection procedure used by almost all water authorities is not effective in finding small leaks, especially where the pipe is hard to reach, for example, underneath a building. In-pipe leak detection methods with cameras, acoustic systems and pressure sensing systems can find the location of those leaks more reliably and accurately. Researchers have been developing pressure gradient based in-pipe leak sensors [4], [5]. They use membranes to detect the suction force generated at leaks. It is particularly good for finding small leaks in low pressure, small diameter pipes.

A good in-pipe leak sensor is only useful when a mobile platform can carry it through the water pipes. The city water distribution systems commonly consist of small diameter pipes between 50 to 150 mm (2-6 in). There are many T-functions and elbows. They are operating with water flows inside most all the time. A mobile platform must be able to go through small diameter pipe systems with T-junctions and elbows, under flow condition. Moreover, typical leak sensors use membranes to detect leaks, and those membranes must be kept within a fixed distance to the pipe wall in order to detect leaks. The platform then must have position and orientation stability. The existing in-pipe platforms fail to meet both criteria at the same time. On one end of the spectrum, free floating system such as the Smartball [6] can follow the water flow through pipes with elbows. In-pipe swimming robots such as [7] can actively turn at T-junctions and elbows. Both systems are small and move in pipe without contacting the pipe walls. However, they are easily affected by turbulence in the pipe. They cannot maintain the proper position and orientation of the leak sensor. On the other end, Pipeline Inspection Gauges (PIGs) are flow driven robots; they slide on the pipe walls. They can carry ultrasonic transducers, magnetic flux leakage sensors, and other sensors with similar position and orientation stability requirements, through pipelines [8]. Regular PIGs are rigid and single-piece. Some others are more like trains, having multiple sections connected with joints, such as [9], Single-piece PIGs cannot make sharp turns around pipe elbow but train-like PIGs can. However, all PIGs have been developed for larger diameter pipes; ones for small diameter pipes are difficult to build.

In addition, the insertion and removal of existing robots into and out of water pipes typically requires installation of special entry and exit points. This can be cost prohibitive. The preferred option is to insert robots into pipes and take them out from existing pipe infrastructures, such as fire hydrants. The fire hydrant is essentially a 90-degree bend followed by a T junction connecting to the water pipes. It is difficult for existing rigid, single-piece or multi-sectional robots to go through those bends and T junctions. Without the robots' capabilities to enter and exit water pipes via fire hydrants, it expensive to deploy them in the real water pipes.

It is therefore an object of the invention to provide a robot for carrying a leak sensor through a small diameter, complicated water pipe system including elbows and T-junctions along with mild obstacles while maintaining position and orientation stability for the leak sensor it carries.

SUMMARY OF THE INVENTION

In one aspect, the invention is a leak detection robot including a leak sensor having a diameter to fit closely within a water pipe. The leak sensor is flanked by, and bonded to, substantially symmetrical first and second soft bodies. The soft bodies have end caps. Each of the soft bodies has a tapering configuration with a neck portion wherein a soft body length to neck width ratio is selected to allow the soft bodies to bend permitting the passive robot to pass through sharp bends.

In a preferred embodiment, the robot body can perform a sharp bend that is approximately 90 degrees. It is preferred that the end caps have a curvature less than a half circle to facilitate a cap escaping a step obtrusion at T-junctions. It is also preferred that at least one of the soft bodies contains electronics for the sensing, control, decision making, data processing, data storage and communication of the robot. A suitable material for the soft bodies is silicone rubber having a Shore 00-50 hardness. A suitable soft body length to neck width is approximately two.

In another aspect, the passive robot of the invention can carry any sensors and instruments, including those requiring position and orientation relative to the water pipe centerline. In one embodiment, the instrument is a leak sensor having a diameter to fit closely within a water pipe. The leak sensor is bonded to a soft body part of the robot. The soft body has a neck portion such that a soft body length to neck width ratio is selected to allow the soft body to bend permitting the passive robot to pass through sharp bends.

DESCRIPTION OF THE PREFERRED EMBODIMENT

Development of soft robotics in recent years provides an approach for in-pipe water leak detection. Robots made with soft rubber can move while being squeezed or bent [10], [11]. Soft sensors [12], [13] have measured conveniently strains in multiple directions. Soft material was also used to build swimming robots that mimic real fishes swimming [14], [15]. Soft material provides many possibilities for building in-pipe systems; it is resilient, deformable, waterproof, easy to tune and easy to imbed electronics.

Figure 1:
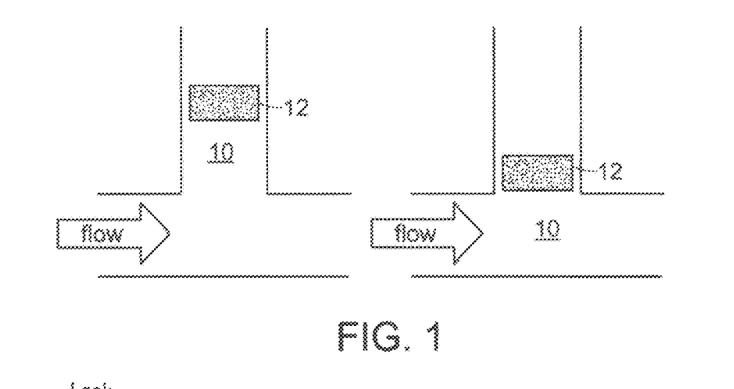
FIG. 1 is a schematic illustration of a soft bodied robot passing through a T-junction in a water pipe system.

A soft material is appealing for its capability to squeeze and bend. In a water pipe, it is common to see debris, scales and other pipe diameter reductions obtruding the path for a robot. Being able to squeeze through those regions makes the robot more reliable. A soft-body robot can naturally follow the flow and bend to turn around elbows. Moreover, with the correct head design, a soft-body robot 10 can bend at T-junctions, as shown in FIG. 1. In this figure, the light colored robot carries a dark colored leak sensor 12, The leak sensor 12 has little adaptability or flexibility. When the system enters a T-junction from a vertical branch, its head will touch the bottom of the T-junction and bend along the direction of the flow. As the frontal part of the robot bends and aligns with the horizontal pipe, the pipe flow will pull on this part of the robot and thus pull the leak sensor 12 into horizontal pipe. The head of the robot must facilitate the turn; it should slide in the horizontal pipe, guide the entire system to turn rather than putting a brake on it. In a different case when the robot enters the T-junction from the left side of the horizontal pipe and intends to go up to the vertical branch, the robot will not be able to do so without actuation. Even with actuation, if the flow speed in the horizontal pipe is high and the robot enters the T-junction with large momentum, it would still have a hard time turning vertical. Thus a soft-body robot can go through T-junctions only in certain cases. Thus when using this robot in a pipe system, the places where it can go will be limited by the layout of the T-junctions and the pipe flow. However, being able to turn at elbows and T-junctions in some cases is already a big leap forward when compared to regular PIGs. Moreover, this limitation makes it easier to predict where this flow driven robot can go.

Figure 2A:
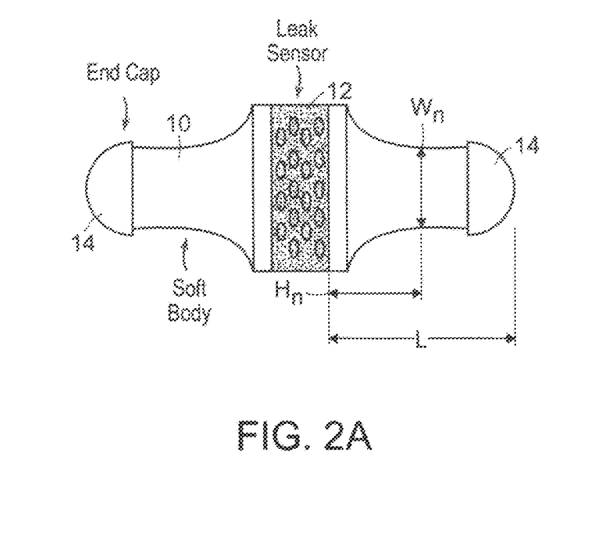
FIG. 2a is an embodiment of the invention including substantially symmetrical first and second soft bodies for bidirectional motion through a water pipe system.
Figure 2B:
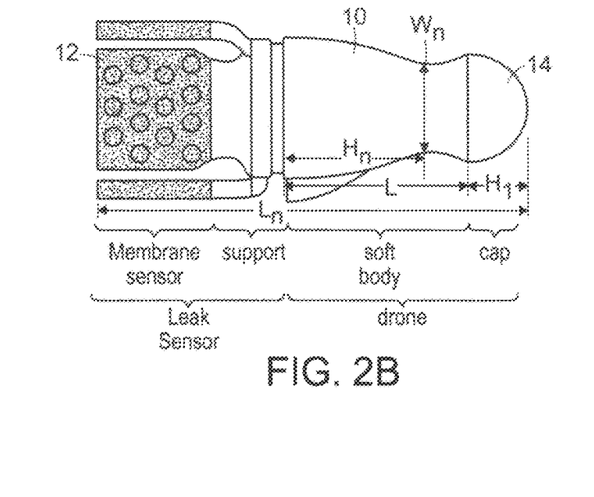
FIG. 2b is an embodiment of the invention with a single soft body for unidirectional motion through a water pipe system.

Thus the concept of the robot disclosed herein is formulated as shown in FIGS. 2a and 2b. Its main body is soft and can bend to go around elbows and T-junctions. It has no actuation and it is flow driven. It is very compact. Electronics (not shown) are imbedded in the soft body for integrity and waterproofness. It has a solid end cap 14 in the front to guide the robot and reduce friction upon contact when it runs into T-junctions and elbows.

The robot 10 carries the leak sensor 12 in the back. A suitable leak sensor is described in [16]. There are four membrane sensor, and four supports and they form a circular pattern when viewed from the back of the robot. Each membrane sensor can be stretched and detects leaks by measuring the stretch forces. When a membrane is on top of a leak, the suction force from the leak will press the membrane against the wall. As the system is moving on, the membrane will be stretched and thus indicate a leak. The supports are like umbrellas; they are spring loaded and forced to expand. They keep the membrane sensors close to the pipe wall.

The robot's ability to turn is determined by its flexibility and its flexibility is dependent on its material and geometry. The material choice is first to be addressed. Then the space factor, L, $H_n$, and $W_n$ in FIGS. 2a and 2b are discussed. From the T-junction case shown in FIG. 1, it can be seen that the length of the robot, L, must be similar to the diameter of the pipe so it can bend in the horizontal pipe before the leak sensor 12 enters. The place that deforms the most easily on the robot is its neck, the thinnest part of its body. Thus the neck location $H_n$ and the neck width $W_n$ affects the robot's ability to bend.

Figure 3A:
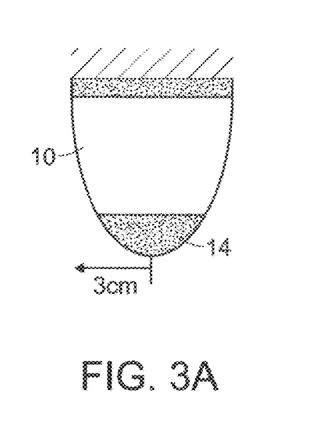
FIG. 3a is a schematic illustration of an experiment to assess materials for the robot of the invention.
Figure 3B:
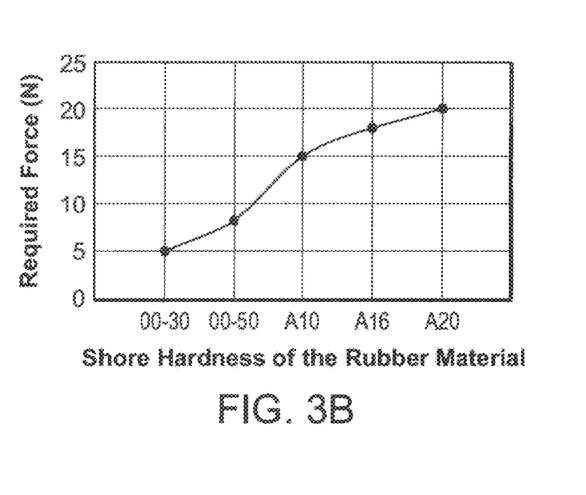
FIG. 3b is a graph of required force against Shore hardness of the rubber material of the soft body.

A set of experiments were conducted to find the best available soft material for this robot 10. The Ecoflex and Moldstar product lines from Smooth-on LLC are a wide range of well-documented and easy-to-make silicone rubber materials. However, hardness does not exactly transfer into spring constants analytically because the shape of the soft body matters. Six products of adjacent Shore Hardness values were experimented. Half ellipsoidal shaped dummy robots as shown in FIG. 3a were made for each material. The soft part is 50 mm long, 45 mm in diameter at the base. On the tip was a rigid cap 14 of 15 mm in height. In the test, each soft body was fixed on a base while its tip was being pulled 3 cm to the left with a dynamometer. The steady state to roe was measured and plotted in FIG. 3b. A low force requirement was preferred, since that translated to a low pressure requirement for the pipe flow to push the robot through bends. The softer silicone rubbers of Shore 00-30 and 00-50 hardness required little force to bend, while the harder ones of Shore A 10-20 required more than twice the force to bend. The last one of Shore A-40 could not be bent and thus not plotted. It was also observed that the soft body made of Shore 00-30 rubber would buckle first with an axial force, while the others bend first given the same loading. Buckling is not desired for turning at T-junctions. Thus the next easiest-to-bend material, Ecoflex silicone rubber of Shore 00-50 hardness, was chosen for the robot. This material is suitable for small pipes of approximately 2 inch inner diameter. Larger pipes require a softer material to maintain the same overall stiffness. This softer material may be either silicone rubber of a lower Shore hardness grade or a different kind of rubber.

Figure 4A:
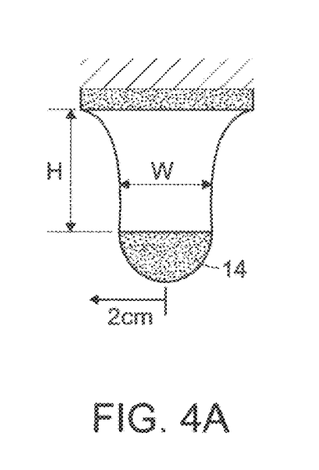
FIG. 4a is a schematic illustration of a soft body including a neck portion to enhance bending.
Figure 4B:
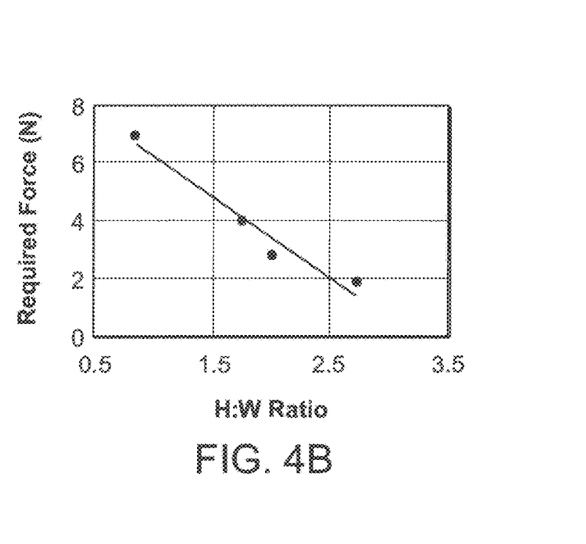
FIG. 4b is a graph of required force against height to width ratio of the soft body.

Similar experiments were also used to determine a feasible robot geometry. It was a hypothesis that if there were a neck in the geometry, a soft body would always bend at the neck, and the required force to bend would be dependent on the size of the neck. A few trials confirmed that the soft body always bent at the neck. Then a set of experiments were designed to determine the neck width. As shown in FIG. 4a, dummy robots with concave shapes of different width to height ratio were made and tested. The height of the soft part, H, was all around 50 mm, and the base was 45 mm in diameter. The neck was set to be 35 mm from the base given the space between the neck and base was needed so contain electronics. The rigid cap 14 was 15 mm high. In the test, each soft body is fixed on the base while its tip is being pulled 2 cm to the left. The steady state force is measured and plotted in FIG. 4b. The first data point was of the same half ellipsoidal soft body from the material test earlier and it is convex. The other three bodies were concave and they all had much lower bend force requirements. As the neck got thinner, the force required to bend was lower at the cost of space in the robot. Thus the median ratio around H:W=2 is chosen for both being easy to bend and having large space in the body. At this H:W ratio, most deformation during a bend occurred at the neck, and the space between the base and the neck was little affected. If electronics were placed in that space, they would not be squeezed or stretched significantly during a bend.

Figure 5A:
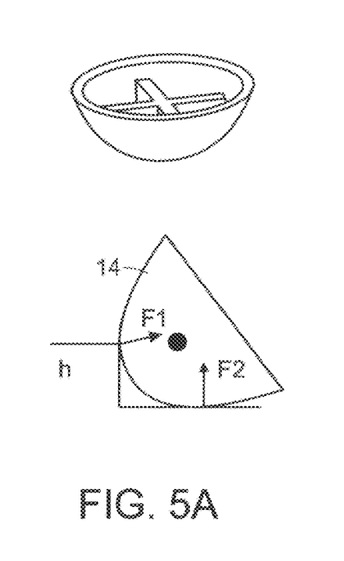
FIGS. 5a, 5b and 5c are schematic illustrations of various end cap configurations to analyze the ability to pass through a junction including a step.
Figure 5B:
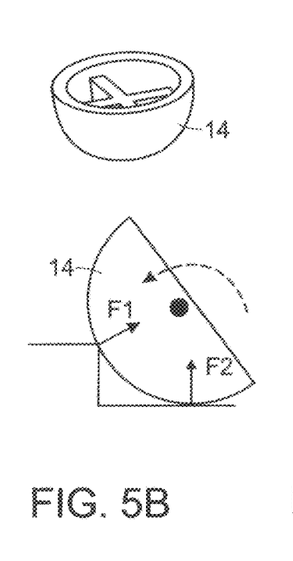
Figure 5C:
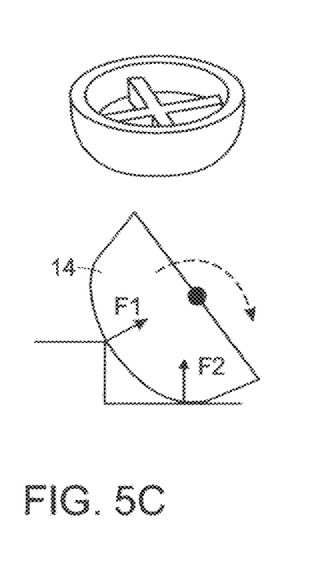

Considerations have also been put into the end cap 14 design for robustness. The end cap 14 is the first point of contact and it guides the other parts of the robot through bends and T-junctions. The curvature of the end cap 14 significantly impacts the robot's capability to avoid jamming at obstacles. One of the known obstacles is the step at some T-junctions, which is an abrupt pipe diameter change. When the robot is being pushed to bend at a T-junction, its end cap will slide along the pipe wall and hit the step. When that happens, the reaction forces at the two points of contact create a moment on the cap, in addition to the friction forces that prevent the cap from rotating. In the cases shown in the FIGS. 5a, 5b, and 5c, depending on where the center of the rotation, or equivalently the center of the cap curvature is, the two reaction forces will result in the cap rotating in different directions. A sharp curvature as in FIG. 5a places the center of rotation (black dot) close to the frontal tip of the cap, and the two normal forces on the cap, F1 and F2, impose opposite moment on the cap. Thus the total moment on the cap is almost zero or minimally counterclockwise. It will require only an actuation force to overcome the friction force and the small counterclockwise moment in order to get the cap over the step. In FIG. 5b, the cap curvature is less sharp and more like a semicircle. The center of rotation is shifted backward and now it is aligned with extension of F1. Thus F1 creates zero moment on the cap, and F2 creates a counterclockwise moment on the cap. It will require more actuation to create a larger clockwise moment in order to lift the cap over the step. The best design shown in FIG. 5e, where the cap has a very large radius of curvature and the center of rotation is in the back. Both forces create a clockwise moment on the cap, reducing the requirement of actuation force for getting the cap over the step.

A prototype for a 52 mm (2 inch) Inner diameter pipe system was built with dimensions derived from the above design analysis. It is shown in FIGS. 2a and 2b. Its dimensions are listed in Table 1. The outer diameter of the robot 10 was 50 mm, in order to accommodate possible rust and dirt in the pipe. The the leak sensor was 52 mm in diameter. Between the leak sensor and the robot, there was a rigid plate of 44 mm in diameter embedded in the silicone rubber. Electronics were also embedded in the silicone rubber and built on the rigid plate. It included a 3.7V 110 mAh lipo battery, an Arduino mini pro 3.3V/8 MHz microcontroller and a Pololu 9 degree of freedom inertia measurement unit (IMU). The cap 14 also was connected to the silicone rubber. The cap 14 had a diameter of 35 mm. It was hollow; the top of the cap could be removed to access a microSD card reader and the battery plugs inside. This configuration allows data download and battery charging after experiments. A rubber o-ring was used to seal the cap 14 when it is closed. The cap was plastic and 3D printed. Epoxy coatings were applied to them to make them water impermeable. After all the non-silicone rubber components were assembled, they were placed inside a mold. Ecoflex 0050 silicone rubber from Smooth-on LLC, in its liquid form, was then poured into the mold. When the silicone rubber cured, the robot was made and it is one piece.

TABLE I

PARAMETERS OF THE ORIGINAL AND THE NEW LEAK SENSOR.

| Dimensions | value |
|---|---|
| L | 50 mm |
| $H_n$ | 35 mm |
| $W_n$ | 25 mm |
| $H_c$ | 15 mm |
| $L_d$ | 117 mm |

Figure 6:
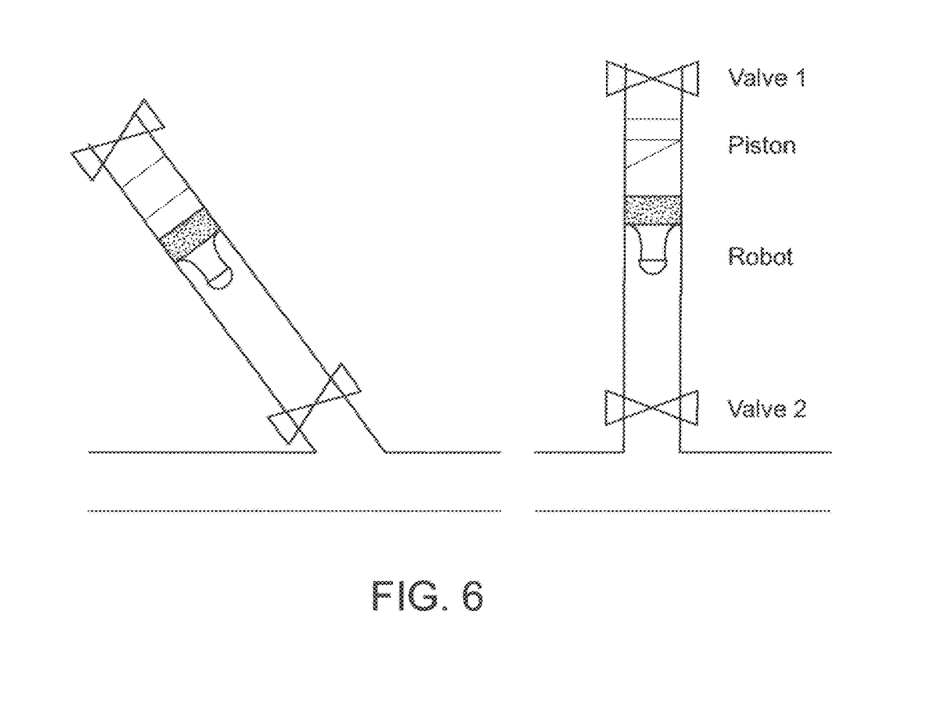
FIG. 6 is a schematic illustration of a disclosed technique tor inserting a robot into a water pipe system.

Two ways of inserting the robot of the invention into the water pipes are devised. The first one is insertion through a Y-junction or T-junction, and it requires minimal modification to existing pipes. The customized junctions are shown in FIG. 6. In the side branch of the junctions, two valves are installed. With the valve 1 open and valve 2 closed, the robot and an actuated piston are placed into the side branch pipe. Then the valve 1 is closed and valve 2 is open. The piston is actuated by either linkages or electromagnetic devices to push the robot through valve 2 into the main pipe. In the case of a T-junction, the piston can have a slope on one side to help aim the robot. With the piston shown in FIG. 6, the robot will always go to the right side of the main pipe when there is no strong water flow in the main pipe. When there is a strong water flow, the robot will always follow the direction of the flow.

This method of inserting the robot through a T-junction was demonstrated in a lab setup. A 2-inch diameter transparent schedule 40 plastic pipe system was used for the demonstration. At the beginning, the water inlet to the T-junction was shut down so there was no flow during insertion. Then an operator placed the robot in the vertical pipe and pushed it into the T-junction with a rod. When the front of the robot reached the bottom of the T-junction, the operator gave it another push and forced the robot to bend to the left. The frontal part of the robot bent but did not completely line up with the horizontal pipe. At this moment, the frontal cap was in contact with the step formed between the straight pipe and the T-junction. The operator drew back the rod before striking the robot. This strike forced the cap out of the step, and the frontal part and the leak sensor in the horizontal pipe. Then the operator gently pushed the back part of the robot into the horizontal pipe. In the next step, the cap on the vertical part of the T-junction was closed, and the water inlet to the right of the T-junction was turned on. The water flow then propelled the robot down the pipe.

This method can be used to put a robot into underground water pipes through fire hydrants. A fire hydrant is connected to the water pipe through a T junction. By opening the fire hydrant, remove the mechanics inside, a technician can then insert the robot into the hydrant, push it down to the T junction and thus into the water pipe.

Figure 7:
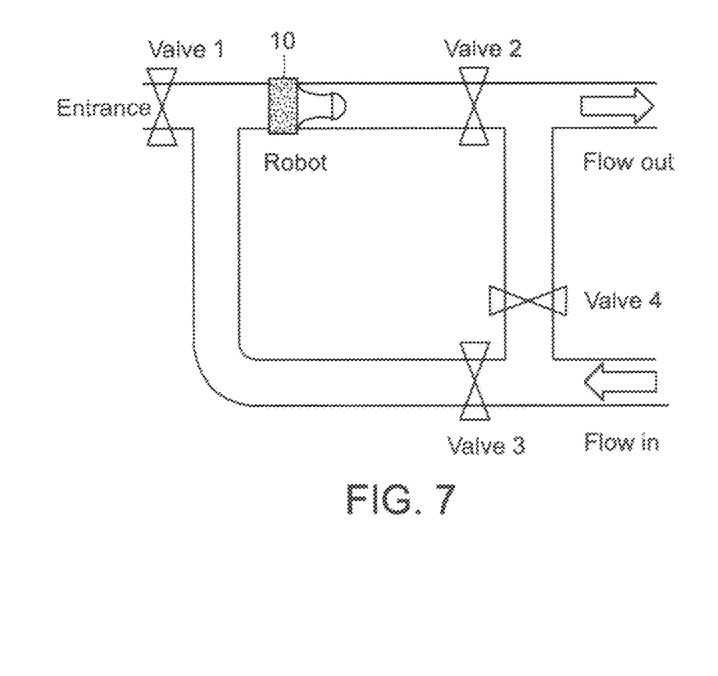
FIG. 7 is a schematic illustration of a bypass loop configuration for inserting a robot into a water flow system.

The second insertion method is to insert the robot into the pipes with a by-pass. A by-pass is a parallel loop addition to the pipeline to give the water stream two route options to go from point A to point B. The loop is described in FIG. 7. Before the robot 10 insertion, valve 1, 2 and 3 are closed and valve 4 is open. The water flow skips the loop and goes through valve 4 to the outlet. Then valve 1 is opened, and the robot is inserted through valve 1 and passing the T-junction to a point close to valve 2. Then valve 1 is closed and valve 3 is opened. This action replenishes the loop with water and pushes the robot against valve 2. Valve 2 is then opened and valve 4 is closed at the same time. The water flow goes through the loop and carries the robot toward an outlet. This kind of parallel loop is mechanically less complex than the T-junction insertion device. It can be added easily to existing bends or U-turns in a water pipe system.

Figure 8:
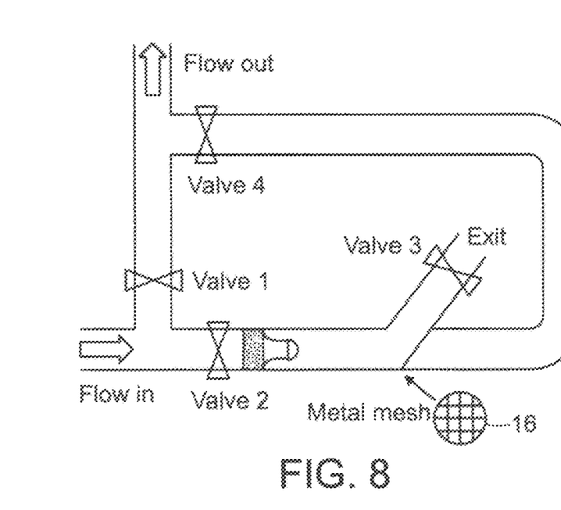
FIG. 8 is a schematic illustration of an embodiment of the invention utilizing a metal mesh for retrieving a robot from a water pipe system.

On the other end of a pipe system, another by-pass with a Y-junction is implemented for retrieving the robot. The retrieval tool setup is shown in FIG. 8. Before the robot enters T-junction on the left which is the start of the parallel loop, valves 1 and 3 are closed and valves 2 and 4 are open. This forces the flow and the robot to enter the parallel loop and move toward the Y-junction. When the robot reaches a metal mesh 16 at the Y-junction, its momentum and the fluid force behind it push it toward valve 3. Meanwhile, the flow goes through the mesh and continues through the parallel loop. The robot then hits valve 3 and produces a clear "dong" sound. After detecting the sound or sensing the arrival of the robot with other methods, the operator opens valve 1 and then closes valves 2 and 4. The flow now skips the parallel loop and moves through valve 1 toward an outlet. Then it is safe to retrieve the robot from valve 3.

This method of retrieving the robot can be implemented on fire hydrants on real water systems. Before the robot arrives at the exiting fire hydrant, the hydrant is opened up and a metal mesh 16 is inserted into the T junction underneath the hydrant. The mesh will intercept the water flow in the T junction. When the robot reaches the metal mesh 16, the fluid will force it to bend along the mesh and come out the T junction. Thus the robot will come out of the fire hydrant. Meanwhile, the water flow will continue downstream through the metal mesh.

Figure 9:
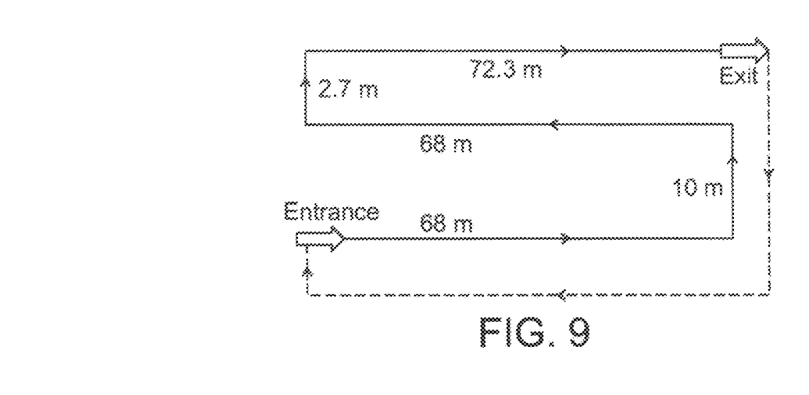
FIG. 9 is a schematic illustration of a 221-meter segment of pipeline used for testing the robot disclosed herein.

The robot of the invention was successfully tested in an industrial facility at Pipetech LLC in Saudi Arabia. The goal of the tests was to verity that this robot was a good mobile platform for carrying sensors through small diameter water pipe systems. The segment of a 2 inch pipeline for the test had four bends and spanned 221 meters (FIG. 9). The entire pipeline was in a horizontal plane.

Tests at two pressure levels were conducted. In a first test, the pipeline input pressure was 4 bar gauge. The test procedure was as follows: the operator deployed the robot with an insertion tool, waited for a few minutes, listened for the robot's arrival inside the retrieval tool, took out the robot and downloaded the motion information from the robot.

This test was repeated for 13 times, and the robot was successfully launched and retrieved in all 13 tests. The average runtime was 345 seconds, and it put the average speed of the robot at about (0.64 m/s. The same tests were repeated 7 times for 2 bar gauge pressure at the pipeline inlet. The average runtime was 550 seconds, and the average speed of the robot was 0.40 m/s. In a total distance of 4,420 meters, the robot went through all 80 elbows and 40 T-junctions (one T-junction in each insertion and retrieval tools) at 100% success rate. It enabled the successful collection of leak measurements for validating the leak sensor's performance, which is presented in [16]. To the best of our knowledge, this was the first untethered robot that successfully ran through a long distance of small diameter water pipe with bends and T junctions when the water pipe was under operating conditions.

We have presented the design of a soft-body robot for carrying sensors through small diameter water pipe systems and methods for inserting and retrieving the robot from the water pipes. The robot is similar to a Pipeline Inspection Gauge; it is propelled by the pipe flow and thus covers a long distance with little power consumption. Unlike regular PIGs, it is made of soft material and it can follow the water flow through pipe elbows. This allows the robot to be used in more complicated pipe systems than long straight ones. A prototype was built and tested in a 52-mm-inner-diameter industrial pipe system. This robot is very competitive for missions in small diameter pipelines.

To use of any in-pipe robots in water mains, we have to put them into the pipes. One way is to add new fittings to pipes for robot insertion and exit, but the construction work required to do so are very costly in the US. The other way is to utilize existing pipe features such as fire hydrants, which is significantly cheaper given no construction work is needed. Fire hydrants are connected to the water main with a pipe elbow and a T-junction. In order to insert the robot into the pipe through a fire hydrant, it is necessary for the robot to be able to turn at pipe elbows and T-junctions. The work in this paper addresses exactly how to realize those capabilities in a reliable and effective way. Thus it can be highly valuable in practice.

The references listed herein are incorporated into this application by reference in their entirety.

It is recognized that modifications and variations of the present invention are contemplated and it is intended that all such modifications and variations be included within the scope of the appended claims.

REFERENCES

[1] NationalWaterResearchInstitute-MeteorologicalService-ofCanada, "Threats to water availability in Canada," *Environment Canada*, 2004.
[2] Vickers A. L, "The future of water conservation: Challenges ahead," Water Resources Update, Universities Council on Water Resources, Tech. Rep., 1999.
[3] Al-Dhowalia K. H., Shammas N. Kh., Quraishi A. A. and Al-Muttair F. F., "Assessment of leakage in the riyadh water distribution network," King Abdulaziz City for Science and Technology, Tech. Rep., 1989.
[4] D. Chatzigeorgiou, You Wu, K, Youcef-Toumi and R. Ren-Mansour, "Reliable sensing of leaks in pipelines," in *ASME Dynamic Systems and Control Conference*, 2013.
[5] D. Chatzigeorgiou, K. Youcef-Toumi and R. Ben-Mansour, "Design of a novel in-pipe reliable leak detector," *IEEE ASME Transactions on Mechatronics*, 2014.
[6] R. Fletcher and M. Chandrasekaran, "Smartball: A new approach in pipeline leak detection," in 2008 *7th International Pipeline Conference*. American Society of Mechanical Engineers, 2008, pp. 117-33.
[7] Y. Wu, A. Noel, D. D. Kim, K. Youcef-Toumi, and R. Ben-Mansour, "Design of a maneuverable swimming robot for in-pipe missions," in *Intelligent Robots and Systems (IROS), 2015 IEEE RSJ International Conference on*. IEEE, 2015, pp. 4864-4871.
[8] J. Quarini and S. Shire. "A review of fluid-driven pipeline pigs and their applications," *Proceedings of the Institution of Mechanical Engineers, Part E: Journal of Process Mechanical Engineering*, vol. 221, no. 1, pp. 1-10, 2007.
[9] Schempf, Hagen and Mutschler, Edward and Goltsberg, Vitaly and Skoptsov, George and Gavaert, Alan and Vradis, George. "Explorer: Untethered real-time gas main assessment robot system," in *Proc. of Int. Workshop on Advances in Service Robotics, ASER*, vol. 3, 2003.

[10] R. F. Shepherd, F. Ilievski, W. Choi, S. A. Morin, A. A. Stokes. A. D. Mazzeo, X. Chen, M. Wang, and G. M. Whitesides, "Multigait soft robot," *Proceedings of the National Academy of Sciences*, vol. 108, no. 51, pp. 20 400-20 403, 20011.

[11] M. T. Tolley, R. F, Shepherd, B. Mosadegh, K. C. Galloway, M. Wehner, M. Karpelson, R. J. Wood, and G. M. Whitesides, "A resilient, untethered soft robot," *Soft Robotics*, vol. 1, no. 3, pp. 213-223, 2014.

[12] A. Frutiger, J. T. Muth. D. M. Vogt, Y. Mengnë, A. Campo, A. D. Valentine, C. J. Walsh, and J. A. Lewis, "Capacitive soft strain sen-sors via multicore-shell fiber printing," *Advanced Materials*, vol. 27, no. 15, pp. 2440-2446, 2015.

[13] J. T. Muth, D. M. Vogt, R. L. Truby, Y. Menguë, D. B. Kolesky, R. J. Wood, and J. A. Lewis, "Embedded 3d printing of strain sensors within highly stretchable elastomers," *Advanced Materials*, vol. 26, no. 36, pp. 6307-6312, 2014.

[14] A. Cloitre, V. Subramaniam, N. Patrikalakis, and P. V. y Alvarado, "Design and control of a field deployable batoid robot," in 2012 *4th IEEE RAS & EMBS International Conference on Biomedical Robotics and Biomechatronics (BioRob)*. IEEE, 2012, pp. 707-712.

[15] P. V. y Alvarado and K. Youcef-Toumi, "Design of machines with compliant bodies for biomimetic locomotion in liquid environments" *Journal of dynamic systems, measurement, and control*, vol. 128, no. 1, pp, 3-13, 2006.

[16] You Wu, Kristina Kim, Michael Finn Henry and Kamal Youcef-Toumi, "Design of a leak sensor for operating water pipe systems," *The 2017 IEEE/RSJ International Conference on Intelligent Robots and System(IROS), Under Review,* 2017.

[17] D. Chatzigeorgiou, R. Ben-Mansour, A. Khalifa and K. Youcef-Toumi, "Design and evaluation of an in-pipe leak detection sensing technique based on force transduction," in *ASME International Mechanical Engineering Congress and Exposition.* 2012.

What is claimed is:

1. A passive robot for traveling inside water pipes comprising:
    at least one soft body, wherein the at least one soft body is connected to sensors or instruments that require particular positions or orientations in the pipe to function;
    an end cap on each at least one soft body;
    wherein each at least one soft body has a tapering configuration with a neck portion, wherein a soft body length to neck width ratio is selected to allow the at least one soft body to bend, permitting the passive robot to pass through a sharp bend, and
    wherein the at least one soft body has a curved profile that tapers along the soft body length to the neck portion, the neck portion being located past a mid-point of the soft body length.

2. The robot of claim 1 wherein the sharp bend is 90°.

3. The robot of claim 1 wherein the end cap has a curvature less than a half circle.

4. The robot of claim 3 wherein the end cap has a radius of curvature configured to create a clockwise moment on the end cap when an upper side of the end cap contacts a step in a pipe and a counterclockwise moment on the end cap when a lower side of the end cap contacts a step in a pipe.

5. The robot of claim 3 wherein the end cap has a center of curvature in a back of the end cap to create a clockwise moment on the end cap when an upper side of the end cap contacts a step in a pipe and a counterclockwise moment on the end cap when a lower side of the end cap contacts a step in a pipe.

6. The robot of claim 1 wherein all electronics are embedded inside the at least one soft body.

7. The robot of claim 6 wherein the electronics are embedded inside of the at least one soft body adjacent to the neck portion.

8. The robot of claim 1 wherein the at least one soft body is made of silicone rubber.

9. The robot of claim 1 wherein the silicone rubber has a shore 00-50 hardness.

10. The robot of claim 1 wherein the soft body length to neck width ratio is approximately two.

11. The robot of claim 1 wherein the at least one soft body includes
    an interface configured to bond to other rigid devices.

12. The robot of claim 1 wherein the soft body length of the at least one soft body is approximately equal to the diameter of a pipe.

13. The robot of claim 1 wherein the soft body length of the at least one soft body is approximately equal to two inches.

14. The robot of claim 1 wherein the at least one soft body includes a concave portion.

15. The robot of claim 1 wherein the at least one soft body includes a convex portion.

16. The robot of claim 1 wherein the sensors include a leak sensor having a diameter substantially equal to a diameter of the pipe.

17. The robot of claim 1 wherein the sensors include a membrane sensor that is configured to stretch in response to a suction force from a leak in a pipe.

18. The robot of claim 1 wherein the robot is a flow driven robot.

19. A passive robot for traveling inside water pipes comprising:
    at least one soft body, wherein the at least one soft body is connected to sensors or instruments that require particular positions or orientations in the pipe to function;
    an end cap on each at least one soft body;
    wherein each at least one soft body has a tapering configuration with a neck portion, wherein a soft body length to neck width ratio is selected to allow the at least one soft body to bend, permitting the passive robot to pass through a sharp bend, and
    wherein the at least one soft body has a curved profile that tapers along the soft body length to the neck portion and the soft body length to neck width ratio is approximately two.

20. A passive robot for traveling inside water pipes comprising:
    at least one soft body having a first end and a second end, the first and second ends being on opposite sides of the at least one soft body, wherein the at least one soft body is connected to sensors that require particular positions or orientations in the pipe to function;
    an end cap on each at least one soft body;
    wherein each at least one soft body has a tapering configuration with a neck portion, wherein a soft body length to neck width ratio is selected to allow the at least one soft body to bend, permitting the passive robot to pass through a sharp bend, wherein the at least one soft body has a curved profile that tapers along the soft body length to the neck portion, and wherein the end cap is disposed on the first end of the at least one soft body and the sensors are disposed at the second end of the at least one soft body.

\* \* \* \* \*

UNITED STATES PATENT AND TRADEMARK OFFICE
CERTIFICATE OF CORRECTION

PATENT NO. : 10,451,210 B2
APPLICATION NO. : 15/597345
DATED : October 22, 2019
INVENTOR(S) : You Wu et al.

Page 1 of 1

It is certified that error appears in the above-identified patent and that said Letters Patent is hereby corrected as shown below:

In the Claims

Column 10, Line 12, Claim 9, change "claim 1" to claim 8.

Signed and Sealed this
Fourteenth Day of July, 2020

Andrei Iancu
*Director of the United States Patent and Trademark Office*